Figure 1:
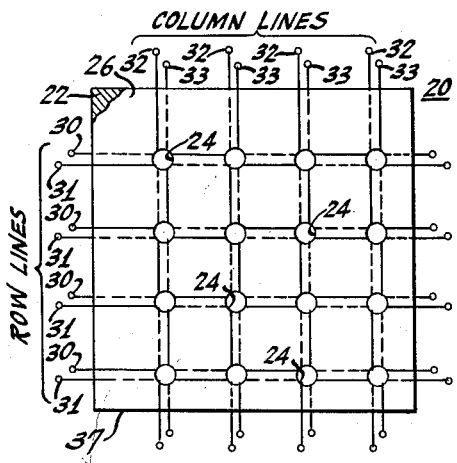

Dec. 1, 1964   C. W. HENDERSON   3,159,486
METHOD OF MAKING ELECTRICAL CONDUCTORS
Filed April 3, 1959   3 Sheets-Sheet 1

INVENTOR.
CLIFFORD W. HENDERSON
BY
ATTORNEY

Dec. 1, 1964          C. W. HENDERSON          3,159,486
METHOD OF MAKING ELECTRICAL CONDUCTORS
Filed April 3, 1959                         3 Sheets-Sheet 2
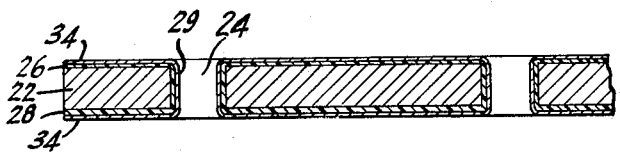
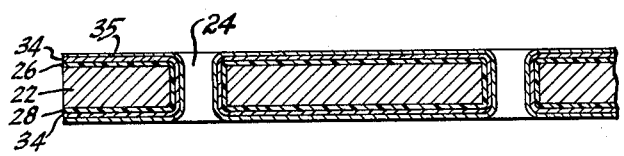
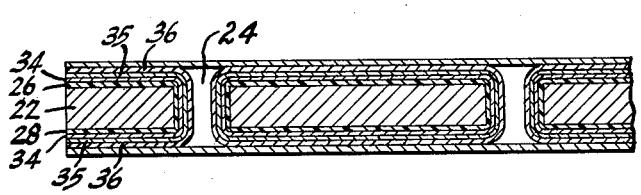
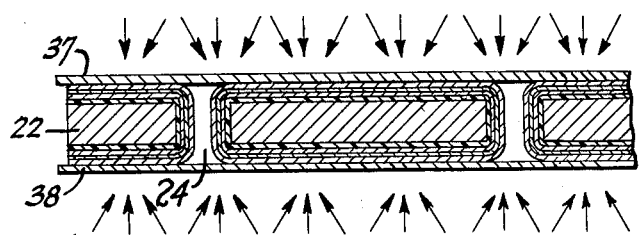
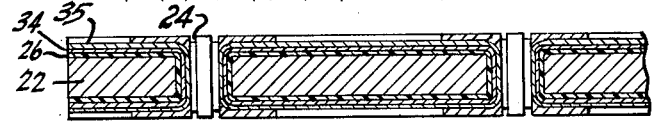
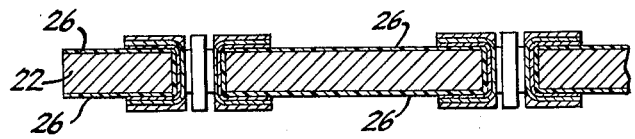
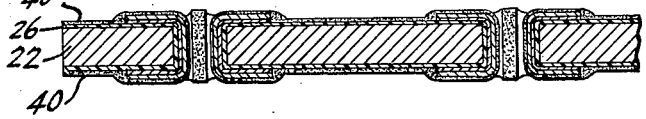
INVENTOR.
CLIFFORD W. HENDERSON
BY
ATTORNEY Dec. 1, 1964  C. W. HENDERSON  3,159,486
METHOD OF MAKING ELECTRICAL CONDUCTORS
Filed April 3, 1959  3 Sheets-Sheet 3
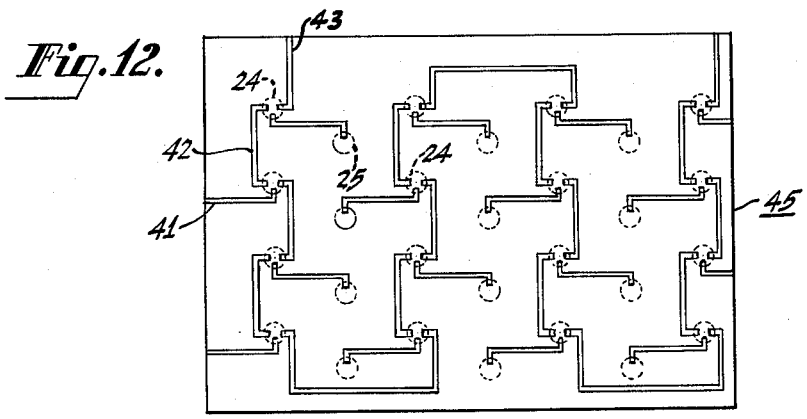
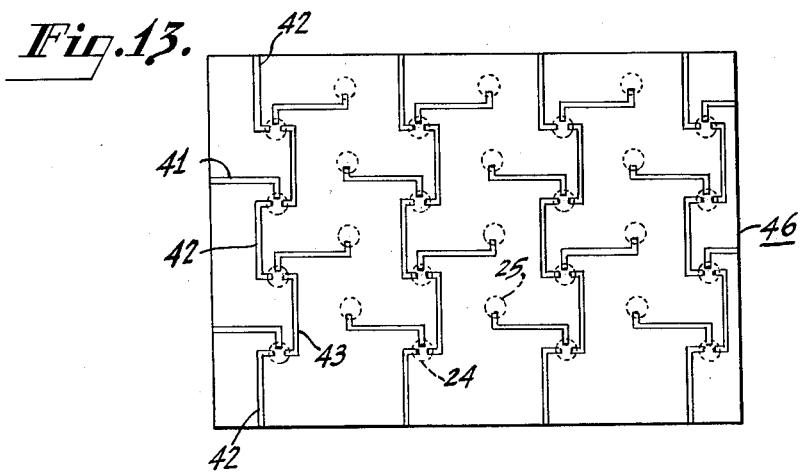
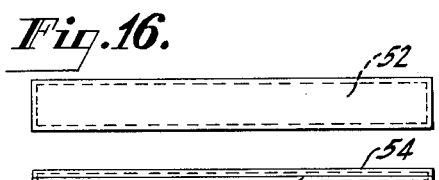
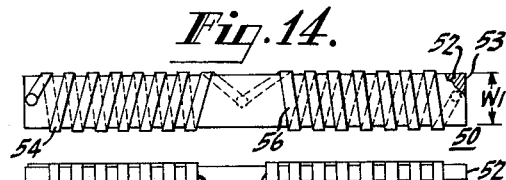
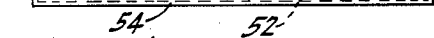
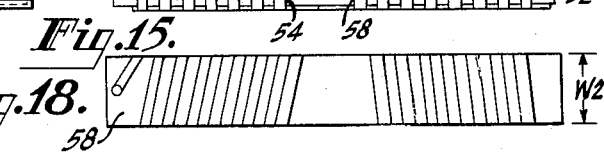
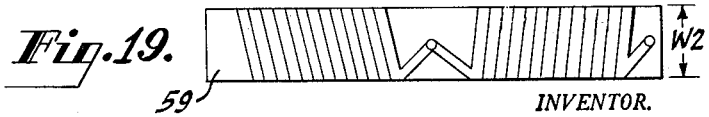
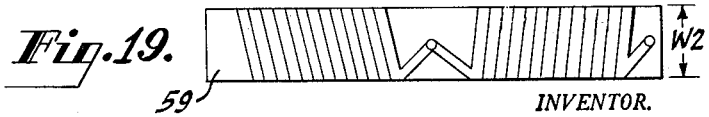
INVENTOR.
CLIFFORD W. HENDERSON
BY
*Milton S. Winters*
ATTORNEY

United States Patent Office 3,159,486
Patented Dec. 1, 1964

3,159,486
METHOD OF MAKING ELECTRICAL CONDUCTORS
Clifford W. Henderson, Princeton, N.J., assignor to Radio Corporation of America, a corporation of Delaware
Filed Aug. 3, 1959, Ser. No. 804,018
9 Claims. (Cl. 96—36)

This invention relates to methods of making electrical conductors, and particularly to methods of making interconnected patterns of such conductors.

Simple patterns of electrical conductors are readily printed on circuit boards. Separate patterns on the surfaces of a board may be interconnected with each other by means of electrical connectors extending through apertures provided at the locations of the different interconnection points. It is usual to provide a separate aperture for each different connection point. The electrical connector may be an eyelet, a staking pin, or in certain cases a further electrical coating covering the inside wall of the aperture.

These prior processes, however, are not readily used in printing complicated, interconnected winding patterns. In practice, the complicated pattern may be simplified by using additional boards, or a complex pattern may be built up by repeating the process a number of times.

It is an object of the present invention to provide improved methods of making electrical conductors using printed circuit techniques.

Another object of the invention is to provide improved methods of making interconnected patterns of electrical conductors.

A further object of the invention is to provide improved methods of making electrical devices having relatively intricate patterns of electrical conductors printed on both surfaces and interconnected through apertures provided in a sheet, or around the edges of a sheet of material.

According to the invention, patterns of electrical conductors are formed on both surfaces of the sheet using conventional photographic methods. The pattern masks extend beyond the "side portions" of the sheet. The term side portions is used herein to designate the walls of the apertures in the case where it is desired to interconnect the patterns through the sheet, or the side edges of the sheet itself in the case where it is desired to interconnect the patterns around the sheet sides. A non-collimated or diffused light source is then used to expose photoresist through the masks. Due to the extension of the portions of the masks, parts of the photoresist on the inner walls of the apertures are exposed, and other parts are not exposed, likewise on the sheet edges. The conductor patterns are then completed using conventional techniques.

Figure 2:
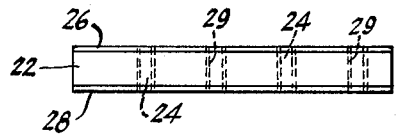
Figure 3:
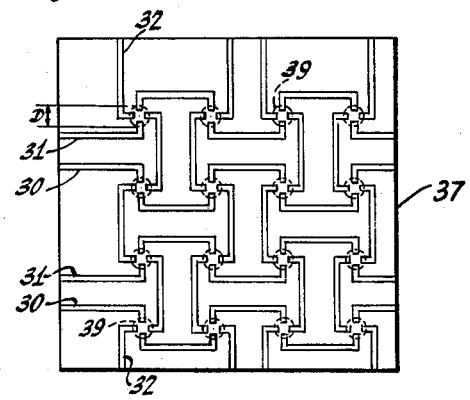
Figure 4:
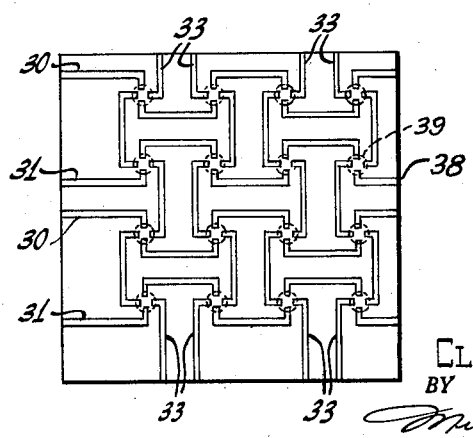

In the accompanying drawings:
FIG. 1 is a top view, partially broken away and partially schematic, of an apertured device according to the invention having conductor patterns interconnected through the apertures;
FIG. 2 is a side view of the device of FIG. 1;
FIGS. 3 and 4 are each a top view of a mask suitable for obtaining the conductor patterns on the article of FIG. 1;
FIGS. 5 through 11 are a series of schematic diagrams showing various steps involved in the process of providing the article of FIG. 1;
FIGS. 12 and 13 are each a top view of a mask suitable for use in obtaining a three-winding device using the methods of the invention;
FIGS. 14 and 15 are top and side views, respectively, with FIG. 14 partially broken away, of an inductance element in accordance with the present invention having the conductor patterns interconnected around the side edges of the element;

FIGS. 16 and 17 are top and side views respectively of an inductance element according to the invention using strips of insulating material; and FIGS. 18 and 19 are top views, respectively, of masks suitable in providing the conductor patterns on the element of FIGS. 14, 15 and FIGS. 16 and 17.

By way of illustration, the invention is described in one embodiment in connection with the making of a memory device suitable for operation in a coincident current memory system. In another embodiment, the invention is described in connection with the making of a variable inductance element. It is understood, however, that the invention is generally applicable to the making of devices, circuits, or components having electrical conductor arrangements interconnected on opposite sides of a printed circuit board or the like.

A top view, partially broken away, of a memory device 20 made according to the present invention is shown in FIG. 1. The memory device 20 includes a sheet 22 of suitable magnetic material. A plurality of apertures 24 are formed in the sheet 22 with the material about each different one of the apertures 24 corresponding to a different storage element. The apertures 24 conveniently are arranged in a matrix, for example, a 4 x 4 matrix of rows and columns. For reasons described hereinafter, the sheet 22 is made relatively thin. By thin is meant, say, a thickness in the order of from two-to-four milli-inches when apertures 24 of, say, fifteen-to-twenty milli-inches diameter are used. The most efficient packing of the storage elements in the sheet 22 is provided when the apertures 24 are spaced from each other with a center-to-center spacing between any two adjacent apertures about equal to one aperture diameter. The magnetic material, if for a memory, may be a metallic or ceramic type so long as the material exhibits a substantially rectangular hysteresis loop characteristic. Suitable metallic material is one which can be rolled into sheets of the desired thickness, such as 4–79 molybdenum-permalloy, 50–50 nickel-iron alloy, an alloy of composition 49 Fe, 49 Co, 2 V, and so on. Suitable ceramic material is a manganese-magnesium-zinc ferrite material.

The apertures 24 are provided by any suitable known technique. When used with an annealed metal material, the apertures 24 are preferably provided by a photoetching process in order the better to preserve the desired magnetic properties. It is found that some mechanical operations such as punching and mechanical boring of the apertures 24 in an annealed sheet of magnetic material may change somewhat the desired magnetic properties. If the metal sheet is initially unannealed, the apertures 24 may be bored or punched as well as photo-etched. The sheet 22 is then annealed in a suitable furnace, such as one containing a dry hydrogen atmosphere, to obtain the desired magnetic properties.

Row winding patterns 30, 31 and column winding patterns 32, 33 are printed on the top and bottom surfaces of the memory sheet 22. The row and column winding patterns on the surfaces of the memory sheet 22 are interconnected with each other through the apertures 24. For convenience of drawing, the row and column windings are shown schematically in FIG. 1. These windings are provided according to the invention by using masks 37 and 38 shown in FIGS. 3 and 4, and described in detail hereinafter.

When the memory sheet 22 is of metal material, the row and column winding patterns are insulated from the sheet itself by any suitable insulating material, as described more fully hereinafter. When the memory sheet 22 is made of ferrite material, the insulating coatings are not required as the ferrite material itself has a coefficient of resistivity sufficient to prevent short-circuiting between adjacent ones of the printed windings. The row windings 30, 31 and the column windings 32, 33 may serve in conventional manner for selecting a desired memory element for storing information in and reading information out of that one element.

FIG. 2 is a side view of the memory sheet 22 provided with insulating coatings 26 and 28 applied to its top and bottom surfaces, respectively. Insulating coatings 29 are applied also to the walls of the apertures 24. The thickness of the sheet 22 is exaggerated for purposes of clarity. A suitable insulating material is a black, high-temperature (250° F.) baking enamel. Other dielectric materials are suitable, provided they can be applied at a temperature less than the Curie temperature for the annealed magnetic sheet 22. Above the Curie temperature, the magnetic properties of the annealed sheet 22 are adversely affected. The sheet 22 may be de-greased and etched, or pickled slightly using conventional methods, if desired, to obtain satisfactory adherence of the insulating coating to the magnetic metal. A primer such as zinc-chromate can also be used. The enameled paint can be applied in any manner so long as the walls of the apertures 24 are coated uniformly. Also, if desired, the side edges of the sheet 22 may be covered with the insulating material. Suitable methods for applying the insulating coating include spraying, electrostatic painting, and so on. The applied insulating paint is then hardened or enameled by baking for a suitable time. It is desirable that the insulating paint have a hard surface.

FIGURES 5 through 11 show in greater detail the various steps performed in carrying out the invention in making the memory device 20. As shown in FIG. 5, a conductive metal coating 34 is deposited over the insulating coatings 26, 28 and 29. In order to obtain good adherence of the metal coating 34, it is preferred to first roughen the surface of the insulating paint as, for example, by sand blasting. The metal coating 34 may be deposited on the thus roughened enameled surface by any suitable process. One process is to use a dual spray applied simultaneously to the insulated device. The two sprays react with each other to produce a thin base layer of colloidal silver over all exposed surfaces of the article of FIG. 1. The thickness of this thin base layer 34 may be built-up, as shown in FIG. 6 by electrically plating a suitable material 35, such as copper, onto the base layer 34.

Another suitable method of providing the metallic coating 34 of FIG. 5 is to deposit copper directly on the roughened surface of the insulating coatings 26, 28 and 29 using electrodeless deposition solutions. Suitable electrodeless solutions are commercially available.

Another method of providing the metallic coating 34 is to deposit a thin layer of silver, using mirror-making solutions and techniques, and to build up the base layer 34 to a desired thickness (FIG. 5) by electroplating techniques. After a metal coating of sufficient thickness is applied to the device, the article of FIG. 5 (or FIG. 6) is completely covered with a suitable photoresist material 36, as shown in FIG. 7. A suitable photoresist is, for example, a photoresistive lacquer applied in a thin layer over all exposed surfaces of the article of FIG. 4 (or FIG. 5) by spraying. This photoresist material polymerizes only when exposed to ultraviolet light.

After the photoresist material 36 is applied, masks 37 and 38 of FIGS. 3 and 4, respectively, are placed against the top and bottom surfaces of the article of FIG. 7, as shown in FIG. 8. The masks 37 and 38 are designed to transmit the ultraviolet light only to the portions of the photoresist 36 where it is desired to locate the various windings.

The masks 37 and 38 may be contact film negatives with the emulsion side placed towards the sheet 22 (FIG. 8). In FIGS. 3 and 4 the masks 37 and 38 are opaque, in those portions in which it is desired to block the ultraviolet light. The masks 37 and 38 are transparent only in those portions in which it is desired to transmit the ultraviolet light. Each of the apertures 24 is indicated schematically in FIGS. 3 and 4 by the larger diameter dotted circles 39 to show the positioning of the masks 37 and 38 relative to the apertures 24. Note that the ends of the transparent strips in the masks 37, 38 extend within the area of the aperture representing circles 39. For example, assuming an aperture 24 of a diameter, say, "D," the transparent strips terminate at a smaller diameter in concentric circles of say, "½D" diameter.

The row windings 30 and 31 alternate between the top and bottom surfaces of the sheet 22 in successive rows of apertures 24, as do the column windings 32, 33 for successive columns of apertures 24. For example, beginning at the left edge of the sheet 22 (FIG. 1), the row windings 30, 31 for the top row of apertures 24 start at the bottom and top surfaces, respectively. The row windings 30, 31 for the second row start at the top and bottom surfaces, respectively, and so on.

The masks 37 and 38 are required to be relatively precisely made and precisely positioned since the various windings in the memory device are spaced relatively close to each other on the sheet surfaces, say with a center-to-center spacing of about ten milli-inches. Also, corresponding row or column windings on the inside walls of an aperture should make good electrical connection with each other. To provide such good connection in any aperture 24, portions of the photoresist exposed through the top mask 37 and through the bottom mask 38 overlap one another. In practice, the end portions of the windings (not indicated in FIGS. 3 and 4) are enlarged somewhat to provide a connecting tab to which other electrical conductors can be attached.

The apertured device of FIG. 8 with the masks 37 and 38 in register with each other is then exposed by means of a suitable ultraviolet light source, the arrows in the figure being a conventionalized representation of the light. A suitable light source is a conventional sun lamp. For example, the device of FIG. 8 may be placed in a conventional light box with the masks 37 and 38 placed into close contact against the photoresist material 36. The desired portions of the photoresist are then exposed simultaneously by means of non-collimated light sources located a suitable distance from the top and bottom surfaces of the light box. In practice, it is found that using a sheet 22 of 1.5 inches by 1.5 in area and two milli-inches in thickness, a suitable distance to obtain a non-collimated light source using sun lamps is in the order of from two to four feet. After exposure by the non-collimated light sources, the exposed portions of the photoresist 36 make reliable contact between the top and bottom surfaces of the sheet 22 along the walls of the apertures 24. The maximum thickness of the metal sheet is fixed by the dispersion of the light within the aperture. If the sheet is thicker than a given value, then a ring of photoresist will be exposed on the inner walls of the apertures. This exposed ring would cause short-circuiting of the different windings within the apertures.

One method of providing suitable masks 37 and 38 is to draw the masks on an enlarged scale, and then make a reduced photographic print of the enlarged drawing. In practice, it is found that four separate windings each of five milli-inches width can be provided on the inside wall of an aperture of fifteen milli-inches diameter.

After exposure, the article of FIG. 8 is washed in a solvent in which the unexposed photoresist is soluble. The portions of the photoresist 36 polymerized by the ultraviolet light are not soluble in the solution and remain on the sheet 22.

After the washing step, undesired portions of the metal coating 34 are now exposed as shown in FIG. 9. The desired windings are covered by the polymerized photoresist. The undesired metal portions are now removed. A suitable method of removing the exposed portions of the metal coating is to use ferric chloride to remove the copper coating 35, and nitric acid to remove the portions of the silver base layer 34. Another method is to electro-etch both metals, the copper and silver, and so forth. If desired, the exposed photoresist now may be removed selectively by known solvents leaving only the separate row and column winding patterns. The device of FIG. 9 after removal of the undesired metal coatings is shown in FIG. 10.

Also, if desired, another insulating coating 40 may be applied, as by spraying, over the row and column winding patterns as shown in FIG. 11. This second insulating coating 40 is used so that a plurality of the memory devices may be directly stacked together without the windings on the various memory devices 20 being short-circuited. Prior to applying any second insulating coating 40, the end portions of the row and column windings are protected from the second insulating coating so that further operating windings may be coupled to the memory device 20. One method of protecting the winding edges is by temporary masking.

Memory devices 20 made according to the invention can be provided with many thousands of storage portions on a single plate in a few simple steps. Apertures as small as ten milli-inches in diameter have been supplied with three and four independent windings each of four milli-inches width on metal sheets 22 of two milli-inches thickness. A three-winding memory device is suitable for operation in certain known memory systems commonly termed a "word-organized" system, a "linear selection" system, or an "end-on" system. Suitable masks 45, 46 for obtaining a three-winding device are shown in top view of FIGS. 12 and 13. The mask 45 may be used for providing the windings on the top surface of the device and the mask 46 used for providing the windings on the bottom surface of the device. Two of the windings are the row and column windings 41 and 42 and the third winding 43 is the "checkerboard" sensing or inhibit winding. The positioning of the masks relative to the apertures in the device is indicated in FIGS. 12 and 13 by dotted circles 24 and 25. The apertures 24 may be used to provide magnetic storage cores or elements in the device, and the apertures 25 may be used as dummy apertures in known fashion. Each storage element includes the material immediately around an aperture 24. Any two adjacent storage apertures 24 in the device are separated from each other by a dummy aperture 25. The dummy apertures 25 are used to reduce interaction between the adjacent storage elements. Also, the dummy apertures 25 serve to carry one of the operating windings, for example, the row windings 41 from one surface to the other. By using the dummy apertures, the row and column windings 41 and 42 are linked in the desired senses through any one of the storage apertures 24. Thus, the dummy apertures 25 serve the dual purposes of isolation and polarity reversal, thereby simplifying the making of the three winding memory device and improving its operating characteristics.

The insulating coatings used in any of the process steps may be of one milli-inch in thickness, and the winding coatings may be of one-half mill-inch in thickness. Thus, the total thickness of the memory device using a two milli-inch sheet may be of five milli-inches. In certain instances, metal sheets as thin as one-half milli-inch have been successfully used. Recall that one difficulty with the use of such thin sheets in prior memory systems even though thinness is often desired, has been the difficulty of providing windings on such sheets without adversely affecting the magnetic properties. Thus, for example, these thin metal sheets are very sensitive to mechanical strains such as bending.

FIGS. 14 and 15 are respectvely top and side views of an inductance element 50 made according to the present invention. The element 50 is made from a thin sheet 52 of suitable magnetic material. The sheet 52 is arranged in the form of an elongated strip. The strip 52 is coated with a suitable insulating material 53 by any suitable process. Also, if desired, the metal strip 52 can be sandwiched between a pair of insulating strips of suitable material, such as a polyvinyl resin material, as shown in FIGS. 16 and 17. The strips of insulating material are preferably wider than the metal strip 52 so that the side edges of the strip 52 are insulated at the same time. This sandwich construction is particularly advantageous when one-eighth milli-inch thick strips 52 are used. A first winding 54 and a second winding 56 (see FIG. 14) are wrapped in helical fashion around the strip 50. The two windings 54 and 56 are printed on either half of the strip 52 and are connected in series with each other. Note, however, that the winding 54 links the magnetic material of the strip 52 in one sense and the winding 52 links the materials of strip 52 in the opposite sense. In the prior art, it was difficult to wind the windings 54 and 56 on a strip 52 using ordinary electrical conductors because the mechanical strains due to the wrapping of the windings 54 and 56 around the strip 52 changed the magnetic properties of the strip 52. The windings 54 and 56 may be provided in the manner described above using the steps of FIGS. 5–11 but using different masks.

Suitable masks 58, 59 for the windings 54 and 56 are shown in FIGS. 18 and 19. Each of the masks 58, 59 has a width $W_2$ greater than the width $W_1$ of the strip 52. The mask 58 of FIG. 18 is used to provide the winding portions on the top and part of the side surfaces of the strip 52, and the mask 59 of FIG. 19 is used to provide the winding portions on the bottom and part of the side surfaces of the strip 52. When the masks 58 and 59 are placed in contact with the strip 52, the non-collimated light used to expose the photoresist also exposes the portions of the photoresist on the side surfaces of the strip 52 to provide the necessary contact between the winding portions on the top and bottom surfaces of the strip 52. In practice, it is found that reliable contact can be made between the top and bottom winding portions on the sides of the strip 52 using winding thicknesses in the order of one milli-inch.

There have been described herein improved methods of making devices requiring relatively complex winding patterns which are interconnected with each other either through apertures provided in the device or along the sides of the device. It will be apparent to those skilled in the art that other useful devices than the ones illustrated herein may be provided using the methods of the present invention.

What is claimed is:

1. In a method of forming a desired printed circuit on an apertured sheet carrying a conductive metallic coating on the top and bottom surfaces and on the walls of said apertures, the steps of covering said coating with a photoresist, placing first and second masks against said top and bottom surfaces, respectively, said masks being in register with each other and being photographic negatives of said desired printed circuit on said respective surfaces and said masks each being arranged to have light transmitting portions extending beyond the edges of those apertures at the locations where said desired circuit extends between said surfaces, and applying a diffused light through said light transmitting portions of said masks to expose portions of said photoresist on said top and bottom surfaces and on said aperture walls.

2. In a method of forming a desired printed circuit on an apertured sheet carrying a conductive metallic coating on the top and bottom surfaces and on the walls of said apertures, the steps of covering said coating with a photoresist, placing first and second masks against said top and bottom surfaces, respectively, said masks being in register with each other and being photographic negatives of said desired printed circuit on said respective surfaces and said masks each being arranged to have light transmitting portions extending beyond the edges of these apertures at the locations where said desired circuit extends between said surfaces, applying a diffused light through said light transmitting portions of said masks to expose portions of said photoresist on said top and bottom surfaces and on said aperture walls, and removing the unexposed portions of said photoresist and the portions of said coating beneath said unexposed photoresist portions, whereby said desired winding pattern is provided by the remaining portions of said conductive coating.

3. In the method of forming electrical conducting patterns on a thin sheet of material, and interconnecting said patterns at desired locations along side portions of said sheet, the steps of applying a conductive coating to said sheet surfaces and said locations, applying a light-hardening resist over said conductive coating, and exposing by a diffused light source portions of said resist on said sheet surfaces and said locations through masks placed in register with each other against said sheet surfaces, said masks having light transmitting areas and light blocking areas, said light transmitting areas conforming to said desired patterns on said sheet surfaces and said light transmitting areas extending beyond the edge of said sheet at said desired locations to permit the exposure of said resist portions along the thickness dimension of said sheet.

4. In a method of providing winding patterns on the top and bottom surfaces of a thin insulating sheet of material with the winding patterns being interconnected along the edges of the sheet, the steps of coating the sheet surfaces and edges with a metallic coating, applying a light-hardening photoresist over said coating, forming a pair of photographic negative masks having transparent areas conforming to the winding patterns on said top and bottom sheet surfaces, respectively, said masks each having transparent areas extending beyond the edges of said sheet at the areas of said interconnection, placing said masks in register with each other against said top and bottom sheet surfaces respectively, exposing by a diffused light source said photoresist through said masks, and removing said unexposed photoresist and the metallic coating underlying the removed photoresist, thereby to form winding patterns on said sheet surfaces which are interconnected along said sheet edges.

5. In a method of forming desired patterns of electrical conductors on the surfaces of a thin insulated sheet with the said patterns being interconnected with each other along desired parts of side portions of said sheet, the steps of coating said sheet surfaces and side portions with conductive metallic coating, applying a photoresist material over said coating, exposing by a diffused light source said photoresist through photographic negative masks of said desired patterns while said masks extend beyond said side portions, and the said masks are in register, opaque portions of said masks preventing exposure of said photoresist along at least part of said side side portions and transparent portions of said masks permitting exposure of said photoresist along said desired parts of said side portions, and removing the unexposed photoresist and the coating lying thereunder, whereby said desired interconnected winding patterns are provided by the remaining portions of said metallic coating.

6. In a method of forming desired patterns of electrical conductors on the surfaces of a thin insulated sheet, with the said patterns being interconnected with each other along desired part of side portions of said sheets, the steps as recited in claim 5, wherein said sheet is in the form of a thin, insulated strip of magnetic material, and wherein the said patterns of electrical conductors are interconnected along the side edges of said insulated strip.

7. In a method of providing a magnetic inductance element having a continuous winding wound on a thin metal strip of magnetic material, the steps of insulating said metal strip, successively coating the top, bottom and side surfaces of the thus insulated strip with a metallic and photoresist material, placing photographic negative masks having transparent portions conforming to said top and bottom surface winding portions in register against said top and bottom surfaces, respectively, said transparent portions extending beyond the side edges of said insulated strip, exposing by a diffused light source said photoresist material through said masks while said masks are in register, and removing said unexposed photoresist and the metallic material lying thereunder.

8. In a method of providing a plurality of separate windings on the top and bottom surfaces of an apertured sheet with each aperture serving to connect a plurality of said top surface windings with a like plurality of said bottom surface windings, the steps of applying a metallic coating to the sheet surfaces and the walls of said apertures, applying a light-hardening photoresist over said coating, forming two photographic negatives of said top and bottom surface windings, with said negatives having light transparent areas extending beyond the edge of any one aperture at each interconnection location of that one aperture, placing said masks in register against said top and bottom sheet surfaces, applying diffused light through said masks to expose portions of said photoresist on said surfaces and said aperture walls, and removing said non-exposed photoresist and the metallic coating lying thereunder, thereby to provide the desired separate windings on said sheet surfaces with the remaining metallic coatings on the aperture walls interconnecting desired ones of said windings.

9. In a method of providing separate windings on the surfaces of a thin apertured sheet, the steps as recited in claim 8, the apertures in said sheet being circular in shape, and the opaque surfaces of said masks at said interconnection points extending a distance of approximately one-half diameter beyond the edge of any one aperture.

References Cited in the file of this patent
UNITED STATES PATENTS
2,897,409    Gitto _____ July 28, 1959

OTHER REFERENCES

Modern Plastics, vol. 31, No. 8, April 1954, pp. 94–95.
Swiggett: Introduction to Printed Circuits, John F. Rider Publisher, Inc., N.Y. 1956, pp. 54–59.
Guditz: "Three Dimensional," Electronics, vol. 30, June 1, 1957, pages 160–163.